United States Patent [19]

Kestian et al.

[11] 4,055,230
[45] Oct. 25, 1977

[54] VEHICLE CONTROL ARMREST IN A VIBRATION ISOLATED CONTROL MODULE

[75] Inventors: Anthony M. Kestian, Berwyn; Raymond J. Allori, Chicago, both of Ill.

[73] Assignee: International Harvester Company, Chicago, Ill.

[21] Appl. No.: 571,442

[22] Filed: Apr. 25, 1975

Related U.S. Application Data

[63] Continuation-in-part of Ser. No. 432,799, Jan. 11, 1974, abandoned.

[51] Int. Cl.² .............................................. B62D 33/06
[52] U.S. Cl. .................................. 180/89.1; 180/77 R; 296/35 R
[58] Field of Search ................. 180/77 R, 77 S, 77 H, 180/77 HT, 89 R, 89 A, 89.1; 296/28 C, 35 R; 244/83 F

[56] References Cited

U.S. PATENT DOCUMENTS

| 2,586,273 | 2/1952 | Steven | 180/77 H |
| 2,618,447 | 11/1952 | Lecarme | 180/77 H |
| 3,618,692 | 11/1971 | Stikeleather | 296/35 R |
| 3,656,799 | 4/1972 | Malm et al. | 180/89 R |
| 3,732,941 | 5/1973 | Davis | 180/89 R |
| 3,774,711 | 11/1973 | Lacey | 180/77 R |
| 3,831,704 | 8/1974 | Zuege | 180/89 R |
| 3,841,430 | 10/1974 | Babbit | 180/89 A |

FOREIGN PATENT DOCUMENTS

| 663,852 | 5/1963 | Canada | 180/77 S |
| 556,451 | 10/1943 | United Kingdom | 180/77 R |
| 630,516 | 10/1949 | United Kingdom | 180/77 R |

Primary Examiner—Robert R. Song
Assistant Examiner—John A. Pekar
Attorney, Agent, or Firm—Douglas W. Rudy; Floyd B. Harman

[57] ABSTRACT

A control module is isolated from the vibrations of a host vehicle through the use of vibration absorbing mounting components and flexible control cables and fluid lines. The control module further incorporates a multiple functioning control armrest integral with the vehicle seat for directing vehicle motion as well as the operation of ancillary equipment. The control module can be used on a wide range of vehicles as a layout of the platform is compatible with many types of vehicles.

2 Claims, 7 Drawing Figures

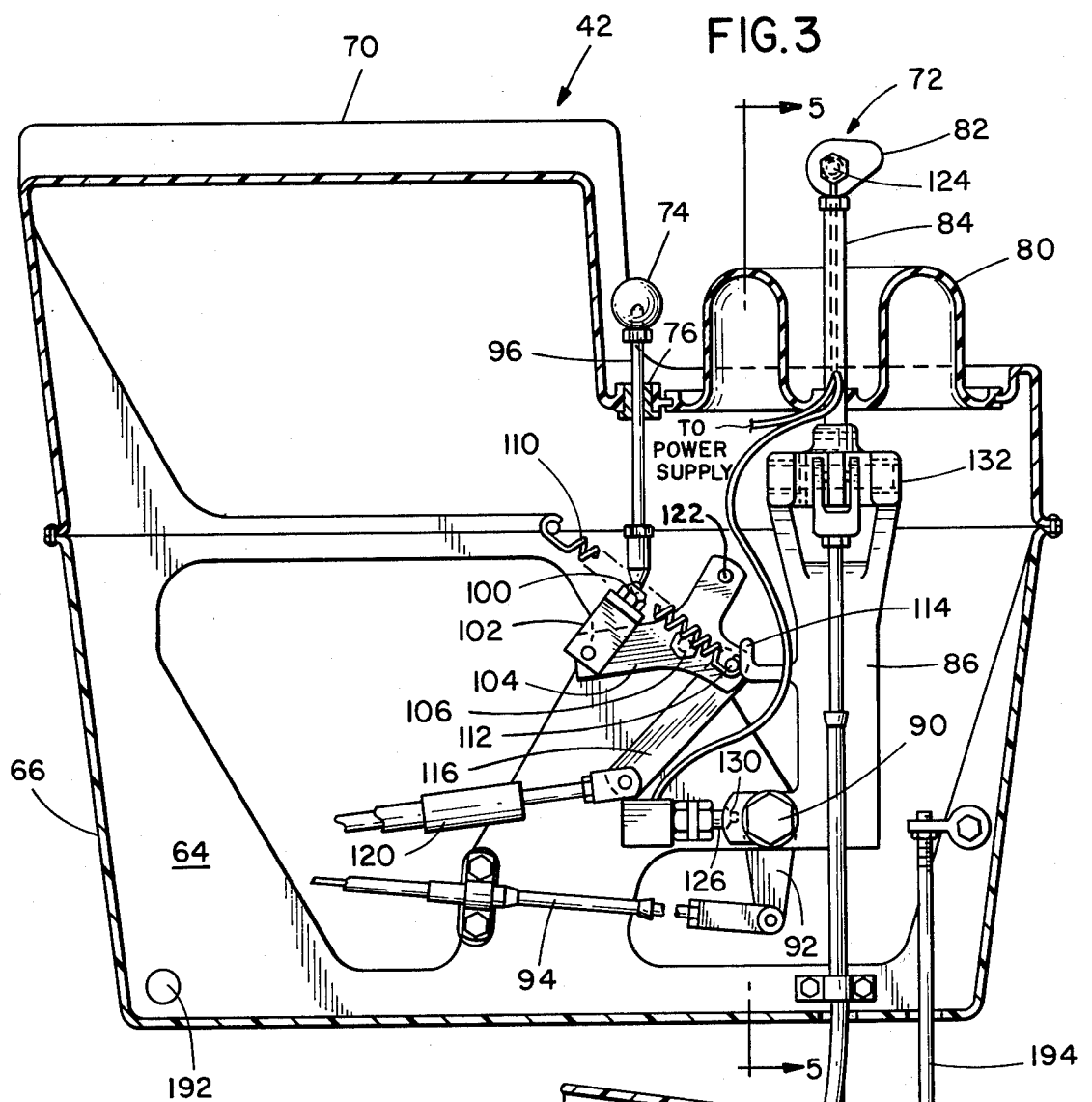
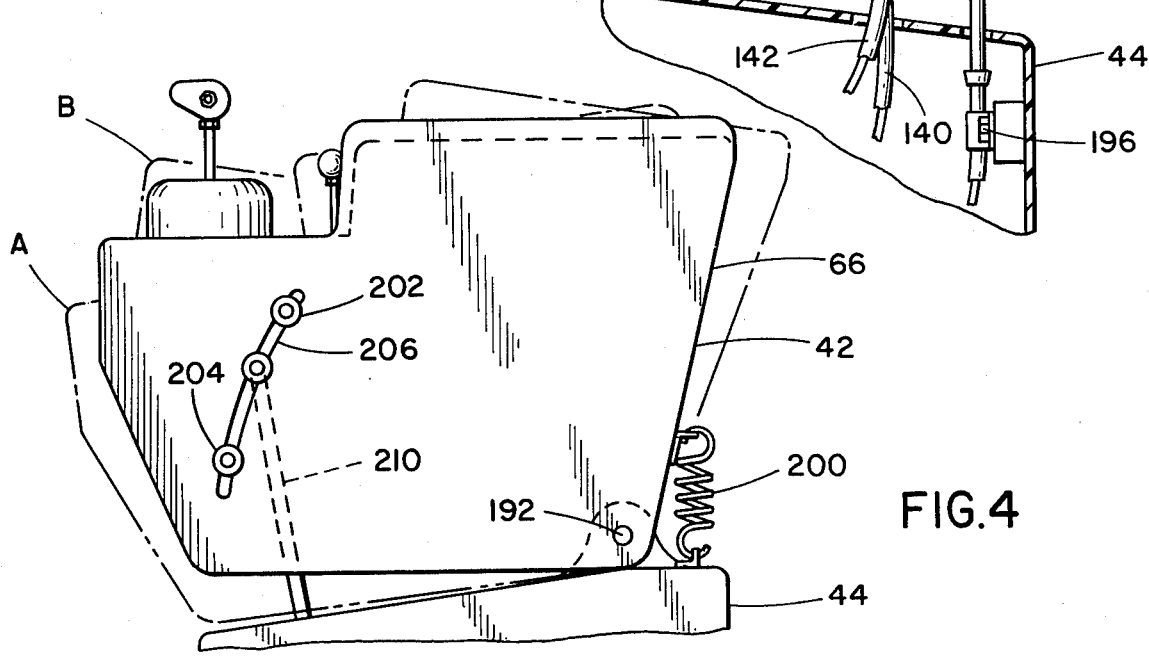

VEHICLE CONTROL ARMREST IN A VIBRATION ISOLATED CONTROL MODULE

RELATED CASE

This application is a continuation-in-part of copending application Ser. No. 432,799, filed Jan. 11, 1974, now abandoned.

FIELD OF THE INVENTION

This invention relates to tractor vehicles and the like having modularized control cabs including similar control apparatus for directing multiple vehicle functions.

BACKGROUND OF THE INVENTION

Present day tractor vehicles are undergoing rapid evolution brought about for the most part by a demand for a vehicle with greatly increased horespower. This results in a development of larger vehicles with the provision of more power controls to aid the operator in such functions as steering, braking, and implement control. Simultaneously, with this growth in vehicle size, new environmental control regulations have made it desirable that the operator be isolated from vehicle produced vibrations and noise. At the present time these problems are solved by providing the operator with a vibration dampened cab and by attempts to vibration dampen or otherwise insulate such components as the brake controls, steering wheel, and other direction control devices from direct contact with the vehicle. The current trend in tractor vehicle design has been toward the isolation of a cab as one problem and isolation of the vehicle controls as a second problem.

Also of consequence of tractor vehicle development is the increase of equipment that is remotely controlled from the operator's work station. Not only does the tractor operator have to attend to vehicle speed and direction as usual but now he also is concerned with operating the ancillary equipment he is working with. As contemporary tractors increase in horsepower, the speed that the tractor is driven increases proportionately. This combination of increased speed and broadening of the operator's responsibility for equipment control imposes a significant work load on the vehicle operator if he is to run the tractor vehicle at its optimum efficiency. In order to simplify the operation of the tractor vehicle, a multiple functioning control armrest integral with the vehicle seat of the control module is disclosed by this invention. The control armrest of the invention incorporates all the functions necessary for the operation of a tractor vehicle such as forward-neutral-reverse drive mode selection, vehicle speed, vehicle braking, and vehicle direction in addition to a functional mode that can be used for control of ancillary implements.

The incorporation of vehicle control mechanisms in a single lever control is well known in the art. A single lever control stick has been applied to various applications where individualized controls would be difficult to operate. Specific examples are wide spread in all-terrain vehicles, powered wheelchairs for invalids, and occasionally other hydrostatic transmission equipped vehicles where the characteristics of the transmission lends itself to the use of a single stick control.

The normal operation of single lever control sticks does not include the operation of ancillary equipment such as tractor trailing implements as taught by this invention, nor do normal single lever control sticks incorporate an armrest serving the two-fold function of providing an ancillary equipment operating means and a support platform for the operator's arm.

The integration of the vehicle controls with the vibration isolated control module is possible through the use of flexible cables and/or hydraulic fluid lines running to the control armrest. The control module would be built on isulation mounted platforms and may consist of at least the vehicle seat having one armrest housing the vehicle and implement control apparatus and the other armrest housing the state of the vehicle indicator panels and other necessary equipment. The platform may also incorporate a contemporary superstructure providing roll-over protection and isolation from weather elements.

The control module of the invention will be compatible with a broad range of vehicles designed for use with the control outputs provided by the control armrest. For instance, on an agricultural tractor the implement hitch, as well as normal speed and direction functions, will be controlled by the control armrest while on a combine, the cutterbar, as well as normal speed and direction functions, would be controlled by the control armrest. The use of a common control module is presently not possible for state of the art vehicle control systems as the steering wheel, brake rods, clutch mechanisms, and shift levers must all be individually positioned for each type of vehicle.

In accordance with this invention, the heretofore separate cab assembly and various control means have been combined as a single unit to form a modularized operator's station. The overall assembly is supported on a vehicle frame by a flexible means such as rubber or vibration isolation mounts. As noted earlier, the controls have been incorporated into a movable armrest on the vehicle seat.

SUMMARY OF THE INVENTION

According to the present invention, there is provided a vehicle control module, which may be mounted on a vehicle by means of vibration isolating mounts, that contains a control armrest for controlling multiple vehicle control functions.

The control module may be compatible with a diverse range of vehicles that may provide for complete isolation from vehicle vibrations and noise.

Thus it is an object of the invention to provide a vibration isolated control module having vehicle control means integral therewith such that vibration is not transmitted to the vehicle operator either by the control module itself or the vehicle control linkages.

It is also an object of this invention to provide a control apparatus that controls at least the basic vehicle functions such as direction, speed, and deceleration in addition to controlling at least one ancillary equipment function.

A further advantage of the proposed invention is to provide a vehicle control module that can be incorporated into a variety of vehicle configurations to reduce the size, weight, quantity and variation across product lines of parts needed to produce various vehicles while providing for increased operator's accessibility of controls and increased operator control of the vehicle.

These advantages and other important advantages become apparent from the disclosure in the following specification and accompanying drawings.

BRIEF DESCRIPTION OF THE DRAWING

FIG. 3 is a side elevation view of the control armrest having a portion of the housing removed to expose the control linkages;

FIG. 4 is a side elevation view of the control armrest showing the pivotable movement potential thereof;

DETAILED DESCRIPTION OF THE DRAWINGS

Figure 1:
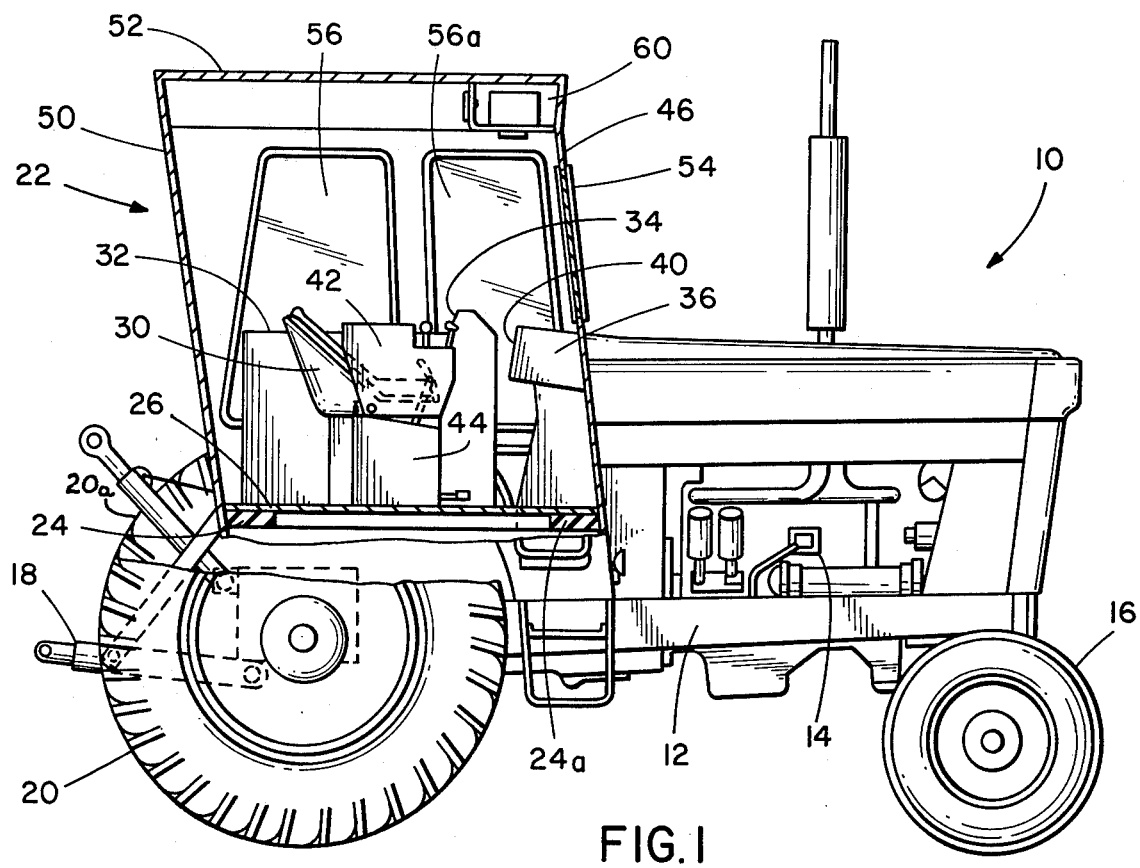
FIG. 1 is a side elevation view of a tractor vehicle having a portion of the control module cut away to expose the vehicle seat and control armrest.

Referring now to FIG. 1 there is shown a tractor vehicle, generally 10, having a main frame 12 supporting an engine 14 and a pair of steerable wheels, one shown as 16 at the forward portion of the frame. A pair of traction wheels, a portion of one shown as 20 and a portion of the second wheel shown as 20a, are mounted on a drive train axle. At the rear portion of the main frame 12 is a modular control cab generally indicated as 22 and a hitch assembly 18 for carrying an implement. The modular control cab 22 is mounted to the main frame 12 on and through the use of resiliently deformable pads shown as 24 and 24a attached to the underside of a floor plate or platform 26 which is a base for equipment making up a workable operator's control platform.

The nature of the mounting pads and the material employed therein must be sufficient to insure that there is no direct contact between the floor plate 26 and the main frame 12. That is, all contact therebetween must be of a flexible vibration dampening nature. As will be more clearly hereinafter described all control conduits are also isolated from the tractor frame 12 by the use of flexible conduits such as push-pull cables or hydraulic hoses. Thus, the operator is totally insulated from the tractor vehicle 10.

Supported on and affixed to the floor plate 26 is a vehicle seat 30 for accommodating a vehicle operator, and an instrument console 32 which serves as an armrest for the operator's left arm as well as an instrument console with a plurality of instruments mounted in the forward portion 34 thereof where the instruments will be visible to the operator. An instrument pod 36 is located on the platform immediately ahead of the vehicle seat 30. An array of instruments are arranged on the operator facing surface 40. A control armrest 42, pivotally mounted on a support podium 44, which may be mounted to the floor plate 26 or to the vehicle seat 30 or its support, will be further described in the following disclosure.

A partially sectioned superstructure 46 is supported on the floor plate 26 and completes the structure of the modular control cab 22. The superstructure 46 may include panels 50 of sheet metal, fiber glass, plastic or the like making up sidewalls and the roof 52 of the structure. The panels 50 and the roof 52 are supported on the framework which would, in addition to providing mounting points for the panels, also act as a roll-over protective structure to provide some protection to a vehicle operator in case of vehicle upset. The control cab 22 may be equipped with a windshield 54 as well as a plurality of windows, two shown as 56 and 56a, as well as other ventilation means as shown by 60.

Figure 2:
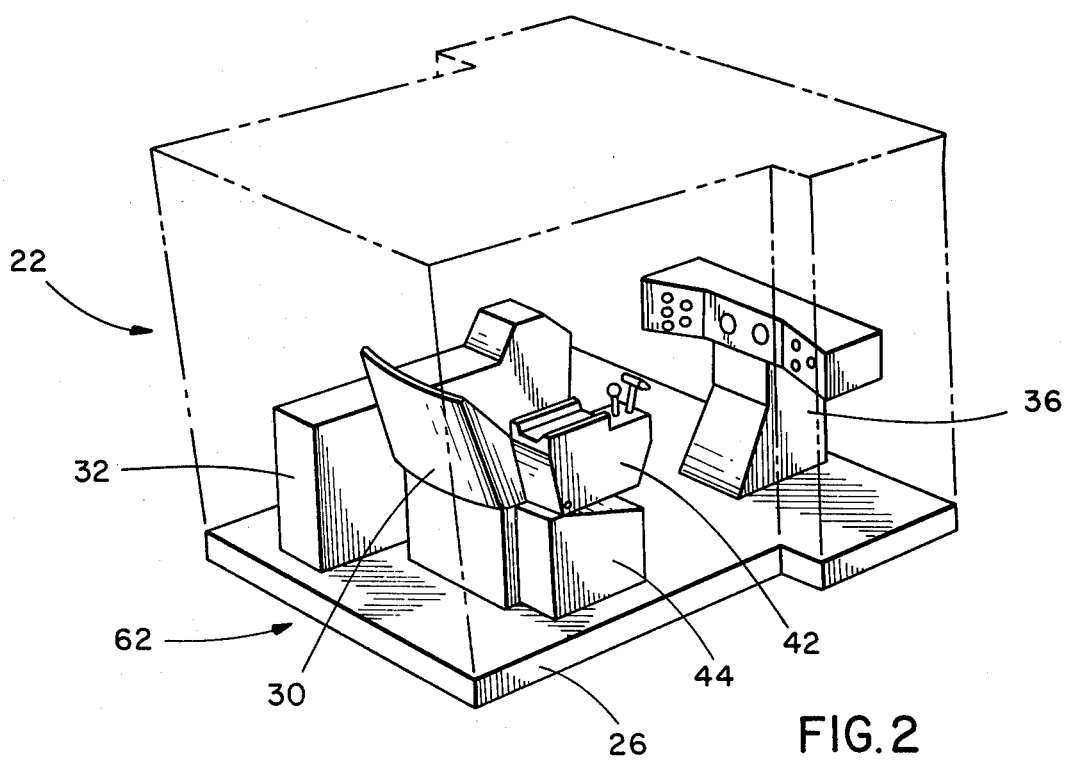
FIG. 2 is a perspective pictorial rendering of the arrangement of the control module equipment.

The perspective arrangement (FIG. 2) of the modular control cab 22 and specifically the modular control platform generally shown as 62 shows the arrangement of the vehicle seat 30, the instrument console 32, the instrument pod 36, and the podium 44 with the control armrest 42. The podium 44 may be mounted to the seat support such that it can be adjusted either with the seat 30 or independent on the seat. This view is presented in order to convey the convertibility and adaptability of the modular control platform to a range of vehicles.

FIGS. 3 and 4 illustrate the control armrest 42 and the relationship between the armrest and the support podium 44.

The control armrest 42 contains control means to effect the operation of the tractor vehicle. Vehicle direction, including forward and reverse, steering, acceleration, braking and implement control can all be directed through the manipulation of this armrest.

A frame structure 64 serves as the skeleton of the armrest control and provides mounting structure for a housing 66 shown sectioned in FIG. 3. The housing 66 encloses other apparatus carried by the frame structure 64 and also provides a surface 70 for accommodating the operator's arm, which is supported at the forearm portion and allows the operator's hand to rest comfortably on a control stick 72 which projects upward through an aperture of the housing. A safety lever 74 projects upward through another aperture of the housing which is equipped with a bushing 76 which prevents the entry of foreign material into the interior of the housing 66 as does the boot 80 which surrounds the control stick 72.

The control stick 72 functions as the main control input for the tractor vehicle. By varying the relative displacement and by specific movement of the control stick 72 the tractor may be steered, direction can be determined and speed in either forward or reverse can be varied. A neutral position is provided also.

The control stick 72 includes a handle 82 supported on a shaft 84 which in turn is pivotally supported upon bifurcated tower 86. The arms of bifurcated tower 86 are provided with bearing surfaces and apertures. This allows shaft 84 to pivot in a plane perpendicular to that of the floor plate 26. Bifurcated tower 86 may rotate around pin 90 which positions the bifurcated tower 86 to the frame structure 64 of the control armrest 42.

A bracket 92 is integral with the lower portion of the tower 86 and extends downwardly therefrom to pivotally mount thereon a push-pull cable 94 for eventually effecting the angle of a swash plate in a hydrostatic transmission or in a different embodiment the degree of engagement in an alternative transmission (neither of which is shown). The linkage provided will translate forward and aft movement of the control stick 72 into extending or contracting movement of the control cable 94. The control cable 94 will determine, through adjustment of the swash plate angle of the hydrostatic transmission, the direction of movement of the tractor 10 and also through the magnitude of control stick 72 movement the speed in which the tractor 10 will move in the selected direction.

Associated with the control stick 72 is a safety lever 74. The function and purpose of this safety lever 74 is to insure against the possibility of actuating the tractor vehicle directly from one direction into another, i.e., from a forward to a reverse direction. In order to achieve the direction change the operator must actuate safety lever 74. The safety lever 74 is associated with a shaft 96 passing through the bushing 76 whereby vertical movement of the shaft 96 is possible. A ball joint 100 is affixed to the lower end of the shaft 96. A link means 102 is pivotally mounted between the ball joint 100 and a bell crank 104, which is mounted for spring loaded (spring 110) over centering rotation around the shaft 106. Also mounted on the bell crank 104 is a first pin 112 which is in abutting relationship with the hook 114 which extends rearwardly from tower 86.

As shown in FIG. 3 the first pin 112 in contact with the hook 114 would prevent the rearward movement of the tower 86. Therefore, only a forward direction is available to the tractor vehicle as the tower 86, as influenced by the shaft 84, can only move forward. A second link means 116, pivoting at one end around pin 112, is communicatively linked to and further directs the position of the shuttle valve actuating means 120 for the hydrostatic transmission (not shown) which functions to allow the vehicle to be driven in an appropriate direction.

When the operator wishes to engage reverse the safety lever will be pulled upwardly over center with assist from spring 110 such that the first pin rotates from behind hook 114 and a second pin 122 rotates down into the valley formed between the bifurcated tower 86 and the upturned portion of the hook 114. This will allow rearward pivoting movement of the control stick 72 but will prevent engaging a forward direction. The shuttle valve actuating means 120 is also actuated signaling the hydrostatic transmission (not shown) to change into a reverse mode.

A second safety device activated by a push button 124 in the handle 82 of the control stick 72 incorporates an electrical release system which moves the plunger 126 into or out of an aperture 130 in the vicinity of the pivot point in the lower portion of the tower 86. This solenoid operated safety device prevents starting of the vehicle engine unless plunger 126 is extended into the aperture 130. Upon the actuation of the vehicle engine, plunger 126 is automatically retracted from the aperture 130. This provides a safety device to insure that the control stick 72 is in neutral before the vehicle can be started.

Figure 5:
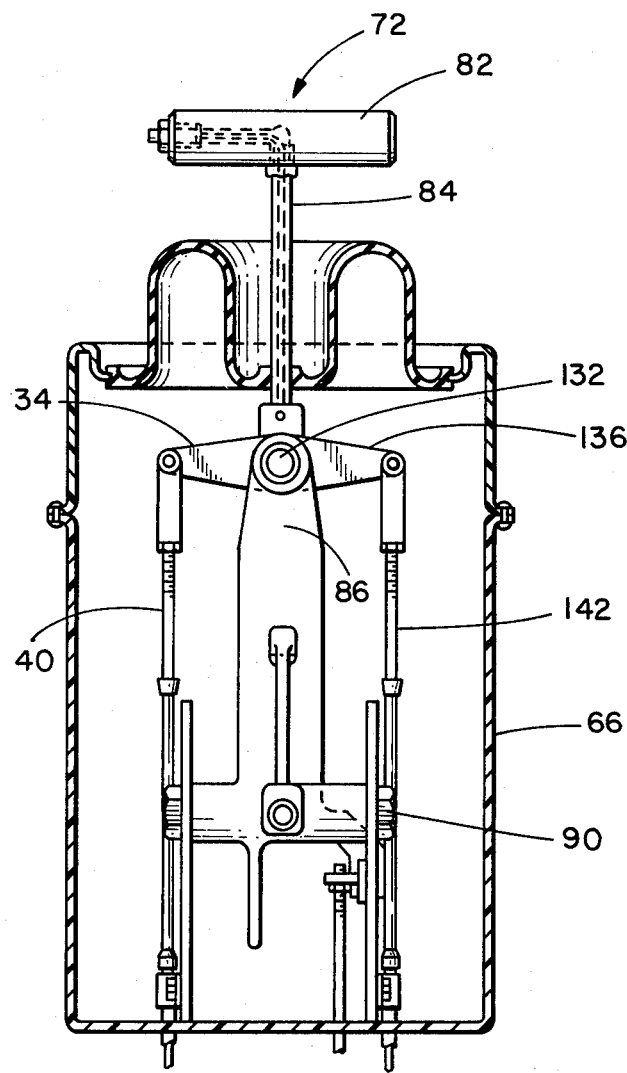
FIG. 5 is a front elevation view of the armrest of FIG. 3 showing significant components of the steering and braking apparatus of the armrest.
Figure 6:
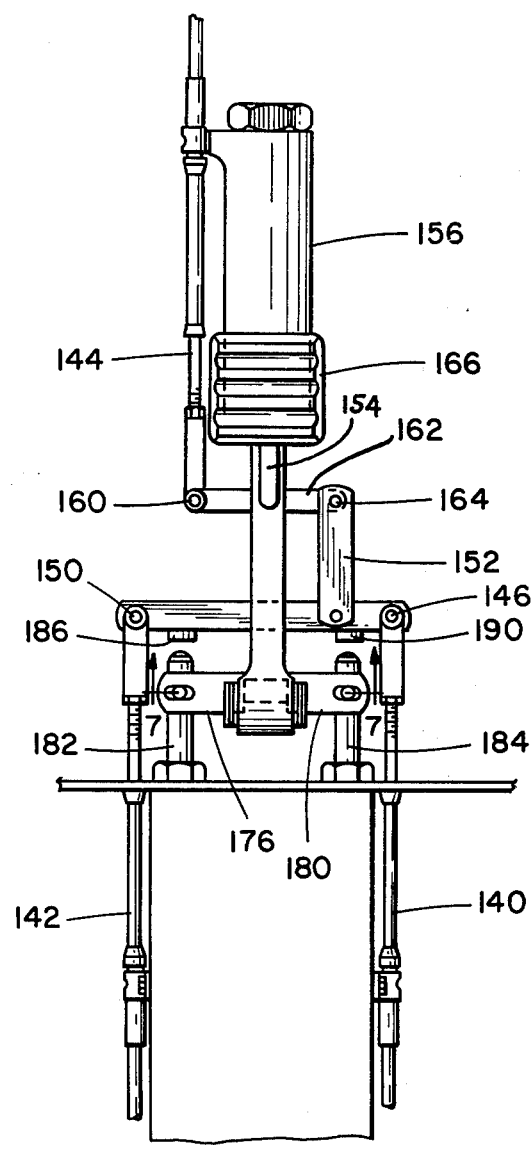
FIG. 6 is a view showing the cylinder actuation portion of the steering and braking system.

The steering function of the control stick 72 is shown by FIGS. 3, 5 and 6. The steering function incorporates the previously discussed pivotally mounted shaft 84 which is pivoted about bearing shaft 132, that is, either to the left or to the right with outriggers 134 and 136 following. In the preferred embodiment pivoting the control stick 72 to the left will cause the tractor to be steered in that direction. The angle to which control stick 72 is pivoted will also determine the rate at which the tractor will turn. The direction and angle at which the control stick is moved will determine the direction and angle in which the steerable wheels 16 will move. As shown in FIG. 5 the movement of the control stick 72 is transferred to a wheel steering control assembly (not shown) by push-pull cables 140 and 142 linked to outriggers 134 and 136 respectively. It should be noted, however, that hydraulic means could be alternatively employed to accomplish the purpose of the steering push-pull cables.

An additional feature of this steering assembly is more clearly explained in FIG. 6 wherein movement of the control stick 72 leading to movement of push-pull cables 140 and 142 is transferred to a single wheel actuating cable 144 which is simply pushed or pulled depending upon the desired direction of the steering. Wheel actuating cable 144 includes a series of link members pivotally secured which pivot at different points depending on the actuation of push-pull cables 142 and 140. For example, assume pivot point 146 moves upwardly and pivot point 150 moves downwardly. This will result in the movement by a link means 152 of the valve spool rod 154 upwardly. Steering control valve 156, upon movement of spool valve rod 154 redirects the flow of hydraulic fluid to cause the steerable wheels 16 to orient in the desired manner. As the steerable wheels orient themselves, feedback is retransmitted from the steerable wheels 16 by a push-pull cable 144 which will cause pivot point 160 to move downwardly and retract valve spool rod 154 to its original position as crossbar 162 will pivot downwardly around pivot point 164.

Figure 7:
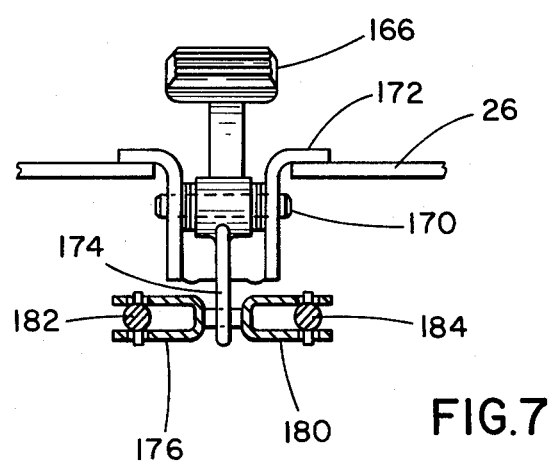
FIG. 7 shows a foot pedal brake arrangement through lines 7—7 of FIG. 6.

Referring now to FIGS. 6 and 7, the vehicle braking and the associated steering enhancing braking will be described.

The assembly includes a pedal 166 pivotally supported on a shaft 170, which is in turn supported by a bracket means 172 that is secured to the floor plate 26. A bracket means 174 extends downwardly from pedal 166 such that upon movement of the pedal, the bracket means 174 is pivoted around shaft 170. Extending off bracket means 174 are a pair of clevis means 176 and 180, these in turn carry hydraulic rod means whereby the respective vehicle mounted brake assemblies can be actuated. In the preferred embodiment the hydraulic valve means are actuated by clevis members 176 and 180 linked to the hydraulic control rods 182 and 184.

An additional feature of the overall steering and braking control assembly is the desirability of being able to brake one of the traction wheels 20 in order to facilitate a very sharp turn. This is accomplished as pivot point 146 moves upwardly and pivot point 150 moves downwardly. If the turn is extreme (control stick 72 urged far from vertical) flat 186 will contact the rod 182 and thus cause the corresponding traction wheel 20 to be braked increasing the sharpness of the turn. The opposite situation would occur if point 146 were moved downwardly and point 150 were moved upwardly. That is, flat 190 would contact rod 184 and brake wheel 20a.

Referring again to FIGS. 3 and 4 another control function of the armrest will be shown. The control armrest 42 can pivot at pivot point 192 with respect to the podium 44 which is equipped to allow pivotal movement of the armrest while maintaining it in position above the podium. A push-pull cable 194 is fixedly but adjustably mounted to the frame structure 64. The shielding housing of the push-pull cable is mounted to the podium as shown at 196 such that movement of the control armrest will cause extension or retraction of the other end of the push-pull cable. The other end of the push-pull cable will be used to actuate the hitch assembly. For instance, an upward pull on the control stick 72 will cause upward pivotal movement of the control armrest 42 and subsequent action of the control cable 194 which will lift the hitch assembly 18 and thus the implement attached to the hitch (implement not shown). Returning the control armrest 42 to a preset "normal" position will return the implement to a working level through the means provided by cable 194.

The armrest control will be biased, as by spring 200 to a given position such as the solid line position of FIG. 4 but could be moved to at least the dotted positions A or B. The range of movement would be adjusted by the vehicle operator through the use of thumb screw bottons 202 and 204 positioned appropriately in channel 206 to limit the movement of the housing 66 with respect to a rod 210 fixedly mounted to the podium 44.

As is apparent, a vehicle assembly has been provided having a frame means, an engine means mounted on the frame, and a plurality of ground engaging wheels such as would be found in a typical agricultural tractor. The improvement comprises an isolated structure which includes the normally separate cab, a roll over protective structure, a vehicle seat, vehicle directing means, as well as instrument display consoles. The vehicle directing means may include steering functions, braking functions, acceleration functions, deceleration functions, forward neutral and reverse transmission functions, as well as hitch control functions. The entire assembly is constructed such that it is a single unit which can be removed from the vehicle as such with the disconnection of cable means such as the push-pull cables or hydraulic lines. The only other contact between the unitized structure and the vehicle are the shock and vibration isolating mounting pads. These latter pads can be of any suitable construction which function to block out the transmission of noise, vibration, and shock, etc. from the vehicle to the operator.

As is apparent the functions to be controlled by the control armrest are a matter of choice and can be varied or expanded depending upon the complexity of a single lever control.

Thus it is apparent that there has been provided, in accordance with the invention, a vehicle control armrest and a vibration isolated control module that fully satisfies the objects, aims, and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of of the appended claims.

What is claimed is:

1. In a tractor vehicle having a main frame, an engine means, traction wheels, steerable wheels, and a drive line means providing for the transmission of motion from said engine means to said traction wheels, the improvement comprising:
    a modular control defining an operator's station mounted above said main frame;
    a vehicle seat having a seat frame structure, including a podium affixed to a side of the seat frame structure, mounted to said modular control platform;
    a pivotal control armrest, including a frame structure, pivotally mounted to said podium, disposed adjacent to said vehicle seat having a shielded push-pull cable mounted to the armrest frame structure, the push-pull cable passing from the control armrest to the podium where the shielding of the push-pull cable is grounded whereby pivotal movement of the control armrest on the podium results in push-pull cable adjustment to provide a vehicle control function;
    a control stick for operating said tractor vehicle through a plurality of flexible control cables, the control stick pivotally mounted to the armrest frame structure;
    an instrument console disposed adjacent to said seat opposite said pivotal control armrest and mounted to said modular control platform;
    an instrument pod mounted to said modular control platform in front of said vehicle seat having an array of instruments for monitoring said tractor vehicle;
    a plurality of resiliently deformable mounting pads positioned between said modular control platform and said main frame whereby said modular control platform is isolated from shock and vibration of said main frame through the use of said resiliently deformable mounting pads and said flexible cables.

2. The invention in accordance with claim 1 wherein said modular control platform includes
    a cab affixed to the modular control platform and isolated from vibrations of the main frame.

* * * * *